(12) United States Patent
Kirschbaum et al.

(10) Patent No.: US 8,927,103 B2
(45) Date of Patent: *Jan. 6, 2015

(54) METHOD FOR PRODUCING BASE-ACTIVATED CARBON

(75) Inventors: Thomas Kirschbaum, Biberbach (DE); Astrid Rota, Lauingen (DE)

(73) Assignee: SGL Carbon SE, Wiesbaden (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/606,641

(22) Filed: Sep. 7, 2012

(65) Prior Publication Data

US 2013/0216831 A1    Aug. 22, 2013

Related U.S. Application Data

(63) Continuation of application No. PCT/EP2011/053442, filed on Mar. 8, 2011.

(30) Foreign Application Priority Data

Mar. 9, 2010 (DE) .......................... 10 2010 002 706

(51) Int. Cl.
*B32B 5/16* (2006.01)

(52) U.S. Cl.
USPC ........... 428/402; 428/403; 428/407; 428/323; 502/416; 502/427; 502/428

(58) Field of Classification Search
USPC .......... 428/402, 407, 403, 323; 502/427, 428, 502/429, 416

See application file for complete search history.

(56) References Cited

U.S. PATENT DOCUMENTS

| | | | |
|---|---|---|---|
| 6,585,915 B2 | 7/2003 | Shinozaki et al. | |
| 7,643,269 B2 * | 1/2010 | Kirschbaum | 361/528 |
| 7,709,415 B2 * | 5/2010 | Sugo et al. | 502/427 |
| 2013/0077207 A1 * | 3/2013 | Kirschbaum | 361/502 |

FOREIGN PATENT DOCUMENTS

| | | |
|---|---|---|
| EP | 1142831 A1 | 10/2001 |
| EP | 1498389 A1 | 1/2005 |

OTHER PUBLICATIONS

Cansado et al: "High Micropore Activated Carbon Prepared from Polyetheretherketone", XP-022264230, Sep. 21, 2007, pp. 2454-2455, vol. 45, No. 12, Oxford, Great Britain.

\* cited by examiner

*Primary Examiner* — Leszek Kiliman
(74) *Attorney, Agent, or Firm* — Laurence A. Greenberg; Werner H. Stemer; Ralph E. Locher

(57) ABSTRACT

A method produces activated carbon, suitable in particular for use in double-layer condensers. The method includes a) producing a mixture of a preferably pulverulent carbon material, a base and a hydrophilic polymer chemically inert to the base, b) pressing the mixture produced in step a) to form a pressing and c) activating the pressed body produced in step b).

16 Claims, No Drawings

METHOD FOR PRODUCING BASE-ACTIVATED CARBON

CROSS-REFERENCE TO RELATED APPLICATION

This application is a continuation, under 35 U.S.C. §120, of international application No. PCT/EP2011/053442, filed Mar. 8, 2011, which designated the United States; this application also claims the priority, under 35 U.S.C. §119, of German patent application No. DE 10 2010 002 706.5, filed Mar. 9, 2010; the prior applications are herewith incorporated by reference in their entirety.

BACKGROUND OF THE INVENTION

Field of the Invention

The present invention relates to a method for producing activated carbon, suitable in particular for use in double-layer condensers.

Activated carbon, also known as activated charcoal, has a very high porosity, and so is used particularly in for removing of unwanted dyes, flavoring agents and/or odorizing agents from gases and liquids, during wastewater treatment or air purification for example. In this context, the activated carbon may be used in the form of granulate, a powder or pellets depending on the application in question.

Besides this use, because of its high porosity activated carbon is also often used as an electrode material, for example in double-layer condensers, the use of which is becoming increasingly widespread because of their high energy density. Such double-layer condensers are configured with two electrodes, kept apart from one another by a separator and coated with electrolyte. In order to maximize the condenser's energy density, the electrodes used in the double-layer condensers must have the highest density possible as well as high porosity.

Activated carbon is generally produced by oxidative thermal activation at 600 to 1000° C., during which a portion of the carbon is transformed into carbon monoxide, which in turn creates more pores in the carbon, increasing the surface area of the substance further still. In this context, oxidative thermal activation usually takes place in the presence of a strong base, preferably potassium hydroxide or another alkali metal hydroxide, and this is why carbon that is activated in a method of this kind is also referred to as alkali-activated carbon or base-activated carbon.

One problem with using alkalis or bases such as potassium hydroxide to activate carbon consists in that a by-product of the oxidative thermal treatment of carbon with a base is a reduction product of the base, in the case of potassium hydroxide this by-product being metallic potassium, which is strongly corrosive and accordingly causes corrosion of the installation in which the activation is carried out.

In order to minimize this problem of corrosion, a method for producing activated carbon is suggested in published, European patent application EP 1 498 389 A1, corresponding to U.S. Pat. No. 7,709,415, in which a carbon material in powder form, for example pulverized pitch fibers, is mixed with potassium hydroxide particles. The mixture thus obtained is then granulated at a temperature of at least 80° C. and preferably under reduced pressure to form granulate particles having an average particle diameter not exceeding 50 mm, after which the granulate particles are dehydrated at a temperature of at least 200° C., preferably under reduced pressure, and the dehydrated granulate particles are then activated in a nitrogen stream at a temperature between 500 and 900° C. Then, the activated carbon particles may be combined with binding agents and filler materials as necessary and shaped into electrodes. This document also describes an alternative method, in which a mixture of carbon material in powder form and potassium hydroxide is subjected to thermal treatment up to a maximum of 300° C. and the mixture treated in this way is then compacted by compression molding into pellets having a diameter not exceeding 20 mm, and these pellets then undergo heat treatment at a temperature between 600 and 1,000° C. in a nitrogen stream. Then the pellets are washed with dilute hydrochloric acid and again with water to obtain activated carbon particles with a particle diameter of 20 μm, for example.

Although the methods described in published, European patent application EP 1 498 389 A1 result in less corrosion of the activation equipment than in corresponding methods in which activation is carried out using a potassium hydroxide fusion, corrosive potassium vapor is still produced in these methods and it is spread throughout the entire installation by the nitrogen stream, so that the potassium also accumulates in the cooler areas of the apparatus and causes corrosion there. Apart from this, this method is very complicated, mainly because of the need to create granulate, which preferably takes place at elevated temperature and reduced pressure.

SUMMARY OF THE INVENTION

The object of the present invention is therefore to provide a method for producing activated carbon that is simple to perform, in which corrosion of the device in which the carbon is activated is reliably prevented, and by which activated carbon is obtained that has a density and porosity that is extremely well suited for use in double-layer condensers.

This object is solved according to the invention by a method for producing activated carbon that contains the following steps:
a) producing a mixture of a carbon material, a base and a hydrophilic polymer that is chemically inert with respect to the base,
b) compacting the mixture produced in step a) to form a briquette, and
c) activating the briquette produced in step b).

The solution is based on the surprising discovery that a method in which a mixture is first made from a preferably pulverulent carbon material, a base and a hydrophilic polymer that is chemically inert with respect to the base and then compacted to form a briquette before being activated in a thermally oxidative process effectively avoids the formation and distribution of the reduction product of the base, such as vaporized potassium, within the installation where the activation takes place. This is due firstly to the fact that neither during nor after the activation is a powder used from which potassium vapor can escape easily while the high temperatures operating during activation prevail because of its large surface area to weight ratio compared with a briquette. Secondly, the addition of the hydrophilic polymer when the mixture is compacted results in a briquette that is dense and structurally stable particularly under the high temperature conditions that prevail during the activation, because the polymer was surprising found to function as a binding agent, that is to say it binds the carbon material particles and the base particles together. For this reason, the briquette is reliably prevented from falling apart even during exposure to the high temperatures used in the activation. Since the briquettes are so stable, internal contact between the reagents is enabled during the activation, which promotes more intense reactivity during the activation, that is to say greater consumption of the base used, so that only a comparatively small amount of base needs to be used. Moreover, in the method according to the invention, activation does not have to take place in a gas stream such as a nitrogen stream; instead, the pyrolysis gases from the carbon material and the hydrophilic polymer automatically result in inertization during the activation, so that the potassium vapor that is present cannot be spread throughout the installation. A further advantage of the method according to the invention consists in that the size of the briquette is freely selectable, rendering the method extremely flexible. This method may also be used particularly to manufacture very large plates, thereby enabling efficient charging of the furnace chamber.

For the purposes of the present invention, the carbon material used in process step a) of the method according to the invention is understood to be any material that contains large quantities of carbon, particularly a material whose composition includes at least 70% by weight carbon, particularly preferably at least 80% by weight carbon, and especially preferably at least 90% by weight carbon.

Also for the purposes of the present invention, a hydrophilic polymer is understood to be a polymer that is liquid at 23° C. and is soluble in water at a rate of 10 g/l at 23° C., or a polymer that is solid at 23° C. but which has a contact angle with water that is less than 90°. For the purposes of the present invention, the term polymer also extends to oligomers as well as polymers in the narrower sense.

For the purposes of the present invention, a polymer that is chemically inert with respect to the base used is understood to be a polymer that does not react with the base, and particularly is not decomposed, especially does not undergo any shortening of its polymer chain after being in contact with the base for 24 hours at 200° C. Moreover, the chemically inert polymer preferably does not lose any of its binding properties when in contact with the base for 24 hours at 200° C.

Process steps a), b) and c) are preferably carried out immediately one after the other, that is to say without any additional intermediate steps, that is to say the mixture produced in process step a) and the briquette produced in process step b) undergo process step b) and process step c) respectively particularly with no dehydrating and/or granulating step in between. In this way, activated carbon may be manufactured simply, quickly and inexpensively.

According to the invention, any hydrophilic oligomer or polymer that is chemically inert with respect to the base used may be used in process step a). For example, good results are achieved if the hydrophilic polymer used is a polyether, or preferably a polyetherpolyol.

In a refinement of the inventive thought, it is suggested that the hydrophilic polymer for use in process step a) may be a polyetherpolyol according to the following general formula (I):

$$HO(-R-O-)_nH \qquad (I),$$

wherein n is a whole number between 2 and 100,000, preferably between 2 and 1,000 and particularly preferably between 100 and 600, and R is a straight-chain or branched-chain alkylene group, possibly substituted with one or more hydroxyl group(s), preferably a $C_1$-$C_{15}$ alkylene group possibly substituted with one or more hydroxyl group(s), and particularly preferably a $C_1$-$C_{10}$ alkylene group possibly substituted with one or more hydroxyl group(s). All of these polyetherpolyols are chemically inert with respect to standard bases and are sufficiently hydrophilic for use in the method according to the invention.

Particularly preferred polyetherpolyols according to the general formula I are such that have a $C_1$-$C_6$ alkylene group, possibly substituted with one or more hydroxyl group(s), as radical R, that is to say those selected from the group of polymethylene glycol, polyethylene glycol, polypropylene glycol, polybutylene glycol, polypentylene glycol, polyhexylene glycol, polyglycerines and any mixtures of two or more of the aforementioned compounds. Polyglycerines that are particularly suitable for the present invention are compounds having the general formula II:

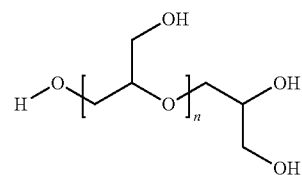

wherein n is a whole number between 2 and 100,000, preferably between 2 and 1,000 and particularly preferably between 100 and 600.

According to a particularly preferred embodiment of the present invention, polypropylene glycol and/or polyethylene glycol is used as the hydrophilic polymer in process step a), in which case liquid polypropylene glycol and/or polyethylene glycol, and particularly polyethylene glycol having a weight-averaged molecular weight (Mw) from 200 to 600 g/mol has proven particularly suitable. If solid polypropylene glycol and/or polyethylene glycol is used, it is preferably used in the form of a fine powder having an average particle diameter between 0.1 and 1,000 µm, particularly preferably an average particle diameter between 0.5 and 50 µm, and especially preferably an average particle diameter between 1 and 10 µm, so that the solid polypropylene glycol and/or polyethylene glycol may be mixed homogeneously with the carbon material. In accordance with the usual definition of this parameter, an average particle diameter is understood to be the $d_{50}$ value, that is to say the particle diameter value is larger than that of 50% of the particles present, that is to say 50% of all the particles present have a particle diameter that is smaller than the $d_{50}$ value.

Particularly in the case that a liquid hydrophilic polymer is used in process step a), in order to prevent the base from dissolving in the polymer it is preferred to mix the hydrophilic polymer with the carbon material first, before adding the base to the mixture that is produced in this manner and mixing it therewith. The mixer that is preferably used for this process is an intensive mixer.

In general, all bases that are suitable for oxidative chemical activation of carbon may be used in process step a), although alkali metal hydroxides and alkali metal carbonates are particularly suitable for this purpose, such as preferably lithium hydroxide, sodium hydroxide, sodium carbonate and potassium carbonate, and especially preferably potassium hydroxide.

If, as is preferred, the base is a solid at room temperature, it too is preferably added in powder form, wherein the average particle diameter of the base is preferably between 0.1 and 1,000 µm, and particularly preferably between 0.5 and 100 µm.

In principle, all carbon materials are usable in process step a), and good results are obtained particularly with the products of pyrolysis from coal, mineral oil or wood, such as pitch and coke. Especially good results are obtained when green coke is used as the carbon material in process step a) that is to say non-calcined coke containing 10 to 15% volatile components. In this context, all types of green coke lend themselves to use in the present invention, including for example isotropic coke, electrode coke and needle coke, and especially preferably pulverulent green coke having an average particle size between 0.1 and 1,000 μm. The actually preferred particle diameter of the green coke used in process step a) depends on the nature of the application in which the activated carbon will be used subsequently. For example, whereas average particle diameters of about 500 μm are preferred if it is to be used as adsorption material, if the activated carbon is to be used as electrode material a smaller average particle diameter is preferred, in particular an average particle diameter between 0.5 und 50 μm, and especially an average particle diameter between 1 und 10 μm. If the activated carbon is to be used in a double-layer condenser, the average particle diameter of the green coke used in process step a) is preferably not larger than 5 to 10 μm.

In the context of the present invention, it has also proven advantageous if the carbon material used in process step a), preferably green coke in powder form, has very little or no porosity smaller than 10 m$^2$/g.

In general, the individual components in process step a) may be used in any proportion relative to each other, and the degree of activation of the carbon is adjusted with the relative quantity of the base, with the proviso that a higher base content in the mixture produced in process step a) also determines a larger specific surface area of the activated carbon in the mixture produced in process step a), and the structural stability of the briquette produced in process step b) is adjusted using the content of hydrophilic polymer, with the proviso that a higher polymer content determines greater structural stability of the briquette. For this reason it is preferred that the hydrophilic polymer is present in the mixture in a proportion of 3 to 10% by weight, whereas the relative proportion of carbon to base is preferably 1:1.5 to 1:2.

Based on these trends, in a refinement of the inventive thought it is suggested to produce a mixture in process step a) that contains 20 to 50% by weight carbon material, 1 to 15% by weight hydrophilic polymer and 35 to 79% by weight base, preferably 25 to 40% by weight carbon material, 2 to 10% by weight hydrophilic polymer and 50 to 73% by weight base, and particularly preferably 30 to 35% by weight carbon material, 3 to 7% by weight hydrophilic polymer and 58 to 67% by weight base.

In a particularly preferred embodiment of the present invention, the mixture produced in process step a) contains 25 to 40% by weight green coke, 2 to 10% by weight polyethylene glycol having a Mw of 200 to 600 g/mol, and 50 to 73% by weight potassium hydroxide, and particularly preferably 30 to 35% by weight green coke, 3 to 7% by weight polyethylene glycol having a Mw of 200 to 600 g/mol and 58 to 67% by weight potassium hydroxide. In these proportions, it is possible to obtain activate carbon with a BET surface area of up to 1,500 or even 2,000 m$^2$/g by the method according to the invention.

In process step b), the mixture produced in process step a) is compacted in accordance with the invention to form a briquette. For the purposes of the present invention, a briquette is understood to be a compacted body that has a longest dimension, that is to say in the case of an at least essentially spherical briquette, a diameter, or in the case of a polygon a length, of at least 50 mm, preferably at least 100 mm, particularly preferably at least 1 cm, and most preferably at least 10 cm. An example of such is a cuboid briquette having both length and width of about 50 cm.

In general, the compacting in process step b) may be performed in any suitable compression mold, wherein the density of the briquette is increased as the compacting pressure rises, and consequently the maximum furnace charge during activation is increased. This is why compacting in process step b) is preferably carried out in such manner that the mixture produced in process step a) is compacted to form a briquette having a density of at least 1 g/cm$^3$, preferably a density of at least 1.25 g/cm$^3$, particularly preferably a density of at least 1.5 g/cm$^3$, and most preferably a density of at least 1.7 g/cm$^3$.

For example, a briquette having a density of about 1 g/cm$^3$ may be produced with a compacting pressure of 100 kg/cm$^2$, whereas briquettes having a density of about 1.7 g/cm$^3$ require a compacting pressure of 5 tons/cm$^2$. For this reason, the compacting in process step b) is preferably carried out in a die press with a pressure of at least 100 kg/cm$^2$.

The most important factors for successful heat treatment according to process step c) are the maximum temperature reached during the heat treatment and the hold time for which this maximum temperature is maintained. According to the invention, the heat treatment of the briquette in process step a) is carried out at a maximum temperature of 500 to 1,500° C., this being set preferably to 700 to 1,000° C., particularly preferably to 700 to 900° C., and most preferably to 850 to 900° C.

In this context, it is preferred that the maximum temperature is maintained for at least 0.5 hours, particularly preferably for at least 1 hour, especially preferably for at least 2 hours, and most especially preferably for at least 3 hours.

The preferred heating rate depends on the quantity of material in the furnace, wherein it is recommended to use lower heating rates for heating large quantities of material uniformly than are required to heat smaller material quantities uniformly. Depending on the quantity of material, good results are generally obtained in the furnace if the heating rate is 1 to 100° C./min, preferably 2 to 50° C./min and particularly preferably 5 to 25° C./min.

In a refinement of the inventive thought, it is suggested to cool the briquette rapidly to room temperature after maintenance of the maximum temperature in process step c), and this may be carried out advantageously in such manner that the briquette is cooled to about 150° C. in the furnace, before the briquette is quenched, preferably in water.

According to another preferred embodiment of the present invention, the activated briquette is washed in a process step d) following the heat treatment in order to remove impurities from the activated carbon. In this context, the washing procedure preferably includes at least a washing step with a mineral acid, such as hydrogen chloride or sulphuric acid, followed by repeated washing with distilled water until neutrality is reached.

A further object of the present invention is activated carbon that is obtainable with the method described in the preceding. Such an activated carbon preferably has a BET surface area of 1,500 to 2,000 m$^2$/g.

A further object of the present invention is the use of the activated carbon described in the preceding as an adsorption material or as an electrode, and preferably as an electrode in a double-layer condenser.

Other features which are considered as characteristic for the invention are set forth in the appended claims.

Although the invention is described herein as embodied in a method for producing base-activated carbon, it is nevertheless not intended to be limited to the details described, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying example.

DETAILED DESCRIPTION OF THE INVENTION 1,666 g green coke (isotropic pitch coke) from the company Sasol Synfuel Ltd. and having an average particle diameter of 3 μm and 166 g polyethylene glycol with a Mw of 200 g/mol were introduced into an intensive mixer manufactured by Eirich and mixed together for 10 minutes. Then, 3,166 g potassium hydroxide having an average particle diameter of approximately 10 μm was added to this mixture and mixing continued for a further 15 minutes. At the end of the mixing operation, a homogeneous mixture having an average particle diameter of about 3 μm was obtained.

The mixture was then introduced into a press manufactured by company Wickert, model WKP2000S, with a die size of 50 cm×50 cm×10 cm and was compacted at room temperature under pressure of 95 kg/cm² to form a briquette having a density of 1.0 g/cm³.

The briquette was then placed in a furnace and subjected to heat treatment with a heating rate of 5° C./min., a maximum temperature of 850° C., and a holding time of 1 hour before the activated briquette was quenched in water and then washed with a mineral acid, in this case sulphuric acid, followed by repeated washing operations with distilled water until neutrality was reached.

The activated carbon produced in this way was shaped to make electrodes in the form of round briquettes, each having a diameter of 10 mm and a mass of approximately 10 mg, and which were measured in a Swagelok cell with 1 M tetraethyl ammonium tetrafluoroborate in acetonitrile as the electrolyte with a "Whatman" glass fiber separator having a thickness of 30 μm. The double-layer condenser reached a specific electrical capacitance of 146 F/g relative to the electrode at 2.3 V and a charging current of 500 mA/g.

The invention claimed is:

1. A method for producing activated carbon, which comprises the following steps of:
   a) producing a mixture of a carbon material, a base and a hydrophilic polymer being chemically inert with respect to the base;
   b) compacting the mixture produced in step a) to form a briquette; and
   c) activating the briquette produced in step b).

2. The method according to claim 1, which further comprises providing a polyether as the hydrophilic polymer in step a), the polyether having the general formula:

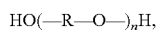

wherein n is a whole number between 2 and 100,000, and R is a straight-chain or branched-chain alkylene group.

3. The method according to claim 2, which further comprises selecting the polyether from the group consisting of polymethylene glycol, polyethylene glycol, polypropylene glycol, polybutylene glycol, polypentylene glycol, polyhexylene glycol, polyglycerines, any mixtures of at least two of the aforementioned compounds, polypropylene glycol having a weight-averaged molecular weight (Mw) from 200 to 600 g/mol, and polyethylene glycol having a weight-averaged molecular weight (Mw) from 200 to 600 g/mol.

4. The method according to claim 1, which further comprises in step a) mixing the hydrophilic polymer with the carbon material first, before the base is added to the mixture produced in this manner and mixed with it.

5. The method according to claim 1, which further comprises selecting the base from the group consisting of an alkali metal hydroxide, an alkali metal carbonate, and potassium hydroxide.

6. The method according to claim 1, which further comprises using coke as the carbon material.

7. The method according to claim 1, which further comprises forming the mixture in step a) to contain 20 to 50% by weight of the carbon material, 1 to 15% by weight of the hydrophilic polymer and 35 to 79% by weight of the base.

8. The method according to claim 1, which further comprises carrying out step b) in a die press with a pressure of at least 100 kg/cm² and the briquette having a density of at least 1 g/cm³.

9. The method according to claim 1, which further comprises:
   performing the activating in step c) via heat treating the briquette at a temperature from 500 to 1,500° C.; and
   maintaining a maximum temperature during the heat treating in step c) for at least 0.5 hours.

10. The method according to claim 2, which further comprises:
    providing a polyetherpolyol as the polyether;
    setting n to be either between 2 and 1,000 or between 100 and 600; and
    selecting R from the group consisting of the straight-chain or the branched-chain alkylene group substituted with at least one hydroxyl group, a $C_1$-$C_{15}$ alkylene group, a $C_1$-$C_{15}$ alkylene group substituted with at least one hydroxyl group, a $C_1$-$C_{10}$ alkylene group, a $C_1$-$C_{10}$ alkylene group substituted with at least one hydroxyl group, a $C_1$-$C_6$ alkylene group, and a $C_1$-$C_6$ alkylene group substituted with at least one hydroxyl group.

11. The method according to claim 6, which further comprises selecting the coke from the group consisting of green coke and green coke having an average particle diameter $d_{50}$ of 1 to 10 μm.

12. The method according to claim 1, which further comprises forming the mixture in step a) to contain 25 to 40% by weight of the carbon material, 2 to 10% by weight of the hydrophilic polymer and 50 to 73% by weight of the base.

13. The method according to claim 1, which further comprises forming the mixture in step a) to contain 30 to 35% by weight of the carbon material, 3 to 7% by weight of the hydrophilic polymer and 58 to 67% by weight of the base.

14. The method according to claim 1, which further comprises:
    performing the activating in step c) via heat treating the briquette at a temperature from 700 to 1,000° C.; and
    maintaining a maximum temperature during the heat treating i9n step c) for at least 1 hour.

15. The method according to claim 1, which further comprises:
    performing the activating in step c) via heat treating the briquette at a temperature from 700 to 900° C.; and
    maintaining a maximum temperature during the heat treating in step c) for at least 2 hours.

16. The method according to claim 1, which further comprises:
    performing the activating in step c) via heat treatment of the briquette at a temperature from 850 to 900° C.; and maintaining a maximum temperature during the heat treatment in step c) for at least 3 hours.

* * * * *